(12) United States Patent
Hisayama et al.

(10) Patent No.: US 9,187,610 B2
(45) Date of Patent: Nov. 17, 2015

(54) POLYPROPYLENE RESIN COMPOSITION AND FOAMED ARTICLE PRODUCED THEREFROM

(75) Inventors: Tetsuya Hisayama, Sodegaura (JP); Nobuhiro Usui, Ichihara (JP); Takashi Sanada, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 774 days.

(21) Appl. No.: 11/256,214

(22) Filed: Oct. 24, 2005

(65) Prior Publication Data

US 2006/0089417 A1 Apr. 27, 2006

(30) Foreign Application Priority Data

Oct. 27, 2004 (JP) ................. 2004-311936

(51) Int. Cl.
| | |
|---|---|
| *C08L 23/08* | (2006.01) |
| *C08L 23/12* | (2006.01) |
| *C08J 9/04* | (2006.01) |
| *C08J 9/00* | (2006.01) |
| *C08L 23/10* | (2006.01) |
| *C08L 23/06* | (2006.01) |
| *C08L 23/16* | (2006.01) |

(52) U.S. Cl.
CPC *C08J 9/04* (2013.01); *C08J 9/0061* (2013.01); *C08L 23/0807* (2013.01); *C08L 23/10* (2013.01); *C08L 23/12* (2013.01); *C08J 2323/12* (2013.01); *C08J 2423/00* (2013.01); *C08L 23/06* (2013.01); *C08L 23/0815* (2013.01); *C08L 23/16* (2013.01); *C08L 2203/14* (2013.01); *C08L 2205/02* (2013.01); *C08L 2308/00* (2013.01)

(58) Field of Classification Search
CPC .................................. C08L 23/12; C08L 23/08
USPC .......................................................... 521/142
See application file for complete search history.

(56) References Cited

U.S. PATENT DOCUMENTS

| 4,211,690 A * | 7/1980 | Asano et al. ................. 524/427 |
|---|---|---|
| 6,300,415 B1 * | 10/2001 | Okayama et al. ............. 525/191 |
| 6,531,551 B2 * | 3/2003 | Ohno et al. ................. 526/124.7 |
| 6,541,123 B1 | 4/2003 | Taniguchi et al. |
| 2001/0016255 A1 * | 8/2001 | Usui et al. .................. 428/318.6 |
| 2001/0053831 A1 | 12/2001 | Ohno et al. |
| 2002/0040105 A1 * | 4/2002 | Kanzaki et al. ............... 525/240 |
| 2002/0082328 A1 * | 6/2002 | Yu et al. ........................ 524/423 |
| 2002/0177657 A1 | 11/2002 | Yunoki et al. |
| 2002/0193527 A1 | 12/2002 | Nakata et al. |

FOREIGN PATENT DOCUMENTS

| EP | 0 457 455 A2 | 11/1991 |
|---|---|---|
| JP | 7-138323 | 5/1995 |
| JP | 10-212319 | 8/1998 |
| JP | 10-330560 | 12/1998 |
| JP | 11-302470 A | 11/1999 |
| JP | 2000-154270 | 6/2000 |
| JP | 2002-173564 | 6/2002 |
| JP | 2002-179858 | 6/2002 |
| JP | 2002-225165 | 8/2002 |
| JP | 2003-020353 | 1/2003 |
| JP | 2003-128854 | 5/2003 |

OTHER PUBLICATIONS

JP 2003-128854—Japanese Patent Office Machine Translation.*
Office Action issued in corresponding Chinese Patent Application No. 200510116051.1 dated Apr. 13, 2010.
Office Action issued in corresponding Chinese Patent Application No. 200510116051.1 dated Apr. 24, 2009.
Office Action issued in corresponding German Patent Application No. 10 2005 051 083.3 dated Apr. 28, 2014.
Office Action issued in corresponding Japanese Patent Application No. 2005-312422 dated Aug. 9, 2011.

* cited by examiner

*Primary Examiner* — Liam J Heincer
(74) *Attorney, Agent, or Firm* — Foley & Lardner LLP

(57) ABSTRACT

Disclosed is a polypropylene resin composition comprising from 50 to 95 wt. % of propylene homopolymer component (A) and from 5 to 50 wt. % of ethylene-α-olefin copolymer component (B1), the polypropylene resin composition having a melt index of not less than 40 g/10 min but less than 500 g/10 min, provided that the percentages by weight are based on the combined weight of the components (A) and (B1), wherein the homopolymer component (A) has an intrinsic viscosity $[\eta]_A$ of from 0.5 to 1.4 dl/g, and wherein the ratio of the intrinsic viscosity $[\eta]_{B1}$ of the copolymer component (B1) to the intrinsic viscosity $[\eta]_A$ of the homopolymer component (A), $[\eta]_{B1}/[\eta]_A$, is from 0.5 to 3. This composition may be modified by addition of a resin component selected from the group consisting of ethylene homopolymer and aromatic vinyl compound-containing rubber. These components are advantageously used for injection foam molding.

8 Claims, No Drawings

POLYPROPYLENE RESIN COMPOSITION AND FOAMED ARTICLE PRODUCED THEREFROM

BACKGROUND OF THE INVENTION

1. Field of the Invention

The present invention relates to polypropylene resin compositions and to their injection foamed articles. Particularly, it relates to polypropylene resin compositions such that they exhibit good moldability and they can afford injection foamed articles having good appearance when they are used for the production of injection foamed articles, and to their injection foamed articles.

2. Description of the Related Art

Polypropylene resin has conventionally been used as material for foaming because of their light weight and superior heat insulation property.

For example, JP 07-138323 A discloses a propylene-based polymer for foaming, especially for extrusion foaming, from which foamed articles having good surface appearance and good heat insulation property can be obtained with good moldability, the polymer comprising a propylene-based polymer having an intrinsic viscosity of from 0.5 to 1.9 dl/g and a ratio of the weight average molecular weight (Mw) to the number average molecular weight (Mn), Mw/Mn, of 6 or more and a propylene-based polymer having an intrinsic viscosity of from 4.5 to 9.0 dl/g.

JP 10-330560 A discloses a resin composition for foaming, the composition being prepared by blending a foaming agent to a crystalline polyolefin resin composition prepared by melt-kneading a propylene-α-olefin copolymer, polyethylene, elastomer and a crosslinking agent.

JP 2002-173564 A discloses a modified polypropylene resin composition having an improved melt characteristics obtained by blending a radical generator to a polypropylene resin composition composed of a high molecular weight polyethylene (co)polymer having an intrinsic viscosity of from 25 to 60 dl/g and a polypropylene (co)polymer having an intrinsic viscosity of from 4 to 12 dl/g and melt-kneading them. A foamed article obtained from this resin composition is also disclosed.

In use in injection foam molding of the polypropylene resin compositions disclosed in the publications cited above, further improvement in moldability of the polypropylene resin compositions and in appearance of resulting injection foamed articles has been demanded.

Under such circumstances, the present invention is intended to provide polypropylene resin compositions such that they exhibit good moldability and they can afford injection foamed articles having appearance when they are used for the production of injection foamed articles and also provide their injection foamed articles.

SUMMARY OF THE INVENTION

The present invention provides, in one aspect, a polypropylene resin composition comprising from 50 to 95 wt. % of propylene homopolymer component (A) and from 5 to 50 wt. % of ethylene-α-olefin copolymer component (B1), the polypropylene resin composition having a melt index of not less than 40 g/10 min but less than 500 g/10 min, provided that the percentages by weight are based on the combined weight of the components (A) and (B1), wherein the homopolymer component (A) has an intrinsic viscosity $[\eta]_A$ of from 0.5 to 1.4 dl/g, and wherein the ratio of the intrinsic viscosity $[\pi]_{B1}$ of the copolymer component (B1) to the intrinsic viscosity $[\eta]_A$ of the homopolymer component (A), $[\eta]_{B1}/[\eta]_A$, is from 0.5 to 3.

In another aspect, the present invention provides a polypropylene resin composition comprising from 50 to 95 wt. % of propylene homopolymer component (A), from 4 to 49 wt. % of ethylene-α-olefin copolymer component (B1) and from 1 to 46 wt. % of resin component (B2) selected from the group consisting of ethylene homopolymer and aromatic vinyl compound-containing rubber, the polypropylene resin composition having a melt index of not less than 40 g/10 min but less than 500 g/10 min, provided that the percentages by weight are based on the combined weight of the components (A), (B1) and (B2), wherein the homopolymer component (A) has an intrinsic viscosity $[\eta]_A$ of from 0.5 to 1.4 dl/g, wherein the ratio of the intrinsic viscosity $[\eta]_{B1}$ of the copolymer component (B1) to the intrinsic viscosity $[\eta]_A$ of the homopolymer component (A), $[\eta]_{B1}/[\eta]_A$, is from 0.5 to 3, and wherein the ratio of the intrinsic viscosity $[\eta]_{B2}$ of the resin component (B2) to the intrinsic viscosity $[\eta]_A$ of the homopolymer component (A), $[\eta]_{B2}/[\eta]_A$, is from 0.5 to 3.

According to the present invention, it is possible to obtain polypropylene resin compositions such that they exhibit good moldability and they can afford injection foamed articles having appearance when they are used for the production of injection foamed articles, and their injection foamed articles.

DESCRIPTION OF THE PREFERRED EMBODIMENTS

In the first aspect, the present invention is directed to a polypropylene resin composition comprising from 50 to 95 wt. % of propylene homopolymer component (A) and from 5 to 50 wt. % of ethylene-α-olefin copolymer component (B1). This composition is hereinafter sometimes referred to as a "first resin composition". The percentages by weight mentioned above are each based on the combined weight of the components (A) and (B1).

In the second aspect, the present invention is directed to a polypropylene resin composition comprising from 50 to 95 wt. % of propylene homopolymer component (A), from 4 to 49 wt. % of ethylene-α-olefin copolymer component (B1) and from 1 to 46 wt. % of resin component (B2) selected from the group consisting of ethylene homopolymer and aromatic vinyl compound-containing rubber. This composition is hereinafter sometimes referred to as a "second resin composition". The percentages by weight mentioned above are each based on the combined weight of the components (A), (B1) and (B2).

If the content of the homopolymer component (A) included in a polypropylene resin composition is over 95 wt. %, the polypropylene resin composition may have a reduced impact strength.

If the content of the component (A) is less than 50 wt. %, the rigidity or heat resistance may deteriorate.

In the present invention, the first resin composition and the second resin composition each have a melt index of from 40 to 500 g/10 min.

When a resin composition has a melt index less than 40 g/10 min, the fluidity is so low that it may be difficult to fill the resin composition into a mold during its injection foam molding.

When a resin composition has a melt index of more than 500 g/10 min, strands of the resin composition formed in its preparation by melt-kneading is unstable and it may be difficult to process the resin composition into the form of pellets.

The homopolymer component (A) used commonly in the first and second resin compositions of the present invention is a homopolymer component prepared by homopolymerization of propylene.

The homopolymer component (A) has an intrinsic viscosity $[\eta]_A$ of from 0.5 to 1.4 dl/g, preferably from 0.7 to 1.2 dl/g.

If $[\eta]_A$ is less than 0.5 dl/g, it is difficult to handle molten resin and it may be difficult to process a resin composition into pellets. If $[\eta]_A$ is over 1.4 dl/g, a resulting resin composition may have an insufficient fluidity and, as a result, it may be difficult to produce injection foamed articles because in injection foam molding a resin composition is injected into a narrow mold space.

The homopolymer component (A) preferably has a Q value (namely, Mw/Mn) of not less than 2 but less than 3.2, wherein that factor is a ratio of the weight average molecular weight (Mw) to the number average molecular weight (Mn) determined by gel permeation chromatography (GPC).

The homopolymer component (A) preferably has an isotactic pentad fraction, measured by use of $^{13}$C-NMR, of 0.97 or more, more preferably 0.98 or more.

The propylene polymer (A) may be prepared by a conventional polymerization method using a conventional stereo regulating olefin polymerization catalyst. The conventional catalyst may, for example, be a Ziegler-Natta catalyst system, a metallocene catalyst system or a catalyst system comprising their combination. The conventional polymerization method may, for example, be bulk polymerization, solution polymerization, slurry polymerization, gas phase polymerization or a polymerization method comprising an optional combination of the foregoing polymerization methods.

The ethylene-α-olefin copolymer component (B1) used commonly in the first and second resin compositions of the present invention is a copolymer component obtained by copolymerizing ethylene and α-olefin. In the first and second resin compositions of the present invention, the ethylene-α-olefin copolymer component (B1) may be composed of either a single kind of ethylene-α-olefin copolymer component or two or more kinds of ethylene-α-olefin copolymer components.

The α-olefin may be α-olefins having from 3 to 12 carbon atoms, examples of which include propylene, butene-1, hexene-1 and octene-1. Propylene, butene-1 and octene-1 are preferred.

Examples of the copolymer component (B1) include ethylene-propylene copolymer, ethylene-butene-1 copolymer, ethylene-hexene-1 copolymer and ethylene-octene-1 copolymer. Ethylene-propylene copolymer, ethylene-butene-1 copolymer and ethylene-octene-1 copolymer are preferred.

The copolymer component (B1) may be prepared by a conventional polymerization method using a conventional polymerization catalyst. The known polymerization catalyst is exemplified by Ziegler-Natta catalyst systems composed, for example, of a titanium or vanadium compound, an organoaluminum compound and a halogenated ester compound, catalyst systems comprising a combination of an alumoxane or a boron compound and a metallocene compound in which a group with at least one cyclopentadienyl anion backbone is coordinated to a titanium atom, a zirconium atom or a hafnium atom, which are so-called metallocene catalyst systems.

Examples of the conventional polymerization method include a method comprising copolymerizing ethylene and α-olefin in an inert organic solvent such as hydrocarbon compounds and a method comprising copolymerizing ethylene and α-olefin substantially in the absence of solvent optionally using hydrogen.

In the first and second resin compositions of the present invention, the ratio of the intrinsic viscosity $[\eta]_{B1}$ Of the copolymer component (B1) to the intrinsic viscosity $[\eta]_A$ of the homopolymer component (A), $[\eta]_{B1}/[\eta]_A$, is from 0.5 to 3, preferably from 1.2 to 3, and more preferably from 1.4 to 3. In the case where the copolymer component (B1) comprises two or more ethylene-α-olefin copolymer components, the above-mentioned requirement regarding intrinsic viscosity ratio is applied to each component.

If the ratio ($[\eta]_{B1}/[\eta]_A$) is too small, the impact resistance will deteriorate. If the ratio is too large, it may be impossible to produce an injection foamed article with good appearance.

In the second resin composition of the present invention including homopolymer component (A), copolymer component (B1) and resin component (B2), the resin component (B2) is a resin component selected from the group consisting of ethylene homopolymer and aromatic vinyl compound-containing rubber. The resin component (B2) may be composed of either a single component selected from the group consisting of ethylene homopolymer and aromatic vinyl compound-containing rubber or two or more components selected from that group.

The ethylene homopolymer used as resin component (B2) may be produced by a conventional method.

Examples of the aromatic vinyl compound-containing rubber used as resin component (B2) include block copolymers comprising aromatic vinyl compound polymer blocks and conjugated diene polymer blocks and substances resulting from hydrogenation of double bonds in the conjugated diene moieties of the block copolymers.

Preferred are substances resulting from hydrogenation of double bonds in the conjugated diene moieties in block copolymers composed of aromatic vinyl compound polymer blocks and conjugated diene polymer blocks. More preferred are substances in which 80% or more of the double bonds in the conjugated diene moieties have been hydrogenated. Even more preferred are substances in which 85% or more of the double bonds of the conjugated diene moieties have been hydrogenated.

The Q value, as determined by GPC (gel permeation chromatography), of the aromatic vinyl compound-containing rubber is preferably 2.5 or less, more preferably 2.3 or less.

The content of aromatic vinyl compound moieties included in the aromatic vinyl compound-containing rubber is preferably from 10 to 20 wt. %, more preferably from 12 to 19 wt. % based on the weight of the aromatic vinyl compound-containing rubber.

The melt flow rate (MFR), as determined at 230° C. in accordance with JIS K6758, of the aromatic vinyl compound-containing rubber is preferably from 1 to 15 g/10 min and more preferably from 2 to 13 g/10 min.

Specific examples of the aromatic vinyl compound-containing rubber include block copolymers such as styrene-ethylene-butene-styrene rubber (SEBS), styrene-ethylene-propylene-styrene rubber (SEPS), styrene-butylene rubber (SBR), styrene-butadiene-styrene rubber (SBS), styrene-isoprene-styrene rubber (SIS), and block copolymers resulting from hydrogenation of the foregoing block copolymers.

Rubber prepared by reacting an aromatic vinyl compound such as styrene with an olefinic copolymer rubber such as ethylene-propylene-nonconjugated diene rubber (EPDM) may also be used.

The aromatic vinyl compound-containing rubber may be produced by a method in which an aromatic vinyl compound is bonded to an olefinic copolymer rubber or a conjugated diene rubber through a reaction.

In the second resin composition of the present invention, the ratio of the intrinsic viscosity $[\eta]_{B2}$ of the resin component (B2) to the intrinsic viscosity $[\eta]_A$ of the homopolymer component (A), $[\eta]_{B2}/[\eta]_A$, is from 0.5 to 3, preferably from 1.2 to 3, and more preferably from 1.4 to 3. In the case where the resin component (B1) comprises two or more components, the above-mentioned requirement regarding intrinsic viscosity ratio is applied to each component.

If the ratio ($[\eta]_{B2}/[\eta]_A$) is too small, the impact resistance will deteriorate. If the ratio is too large, it may be impossible to produce an injection foamed article with good appearance.

In desirable embodiments of the production of the polypropylene resin compositions of the present invention, homopolymer components (A) is produced first by homopolymerizing propylene in the presence of a olefin polymerization catalyst and hydrogen and then copolymer component (B1) is produced by copolymerizing ethylene and α-olefin in the presence of the homopolymer components (A).

The polypropylene resin compositions of the present invention may be produced by kneading their components. The apparatus used for the kneading may be a single screw extruder, a twin screw extruder, a Banbury mixer, a heat roll, etc.

The kneading temperature is typically from 170 to 280° C., and the kneading time is typically from 1 to 20 minutes. All the components may be kneaded at the same time or successively.

The method for producing a resin composition by kneading its components successively may be any of options (1)-(3) shown below.

(1) A method in which a propylene homopolymer component (A) and an ethylene-α-olefin copolymer component (B1) are added successively and kneaded.
(2) A method in which a propylene homopolymer component (A) and an ethylene-α-olefin copolymer component (B1) are kneaded and then a resin component (B2) is further added and kneaded.
(3) A method in which a propylene homopolymer component (A) and a resin component (B2) are kneaded and then an ethylene-α-olefin copolymer component (B1) is added and kneaded.

The melt index of a polypropylene resin composition of the present invention may be controlled by adding peroxide during the kneading of the components which are to be included in the resin composition. Examples of the peroxide include 2,5-dimethyl-2,5-di(tert-butylperoxy)hexene and α,α'-bis(tert-butylperoxy)diisopropylbenzene.

The polypropylene resin compositions of the present invention may optionally form inorganic filler-containing polypropylene resin compositions through inclusion of inorganic filler (C).

The content of the inorganic filler (C) is typically from 0.01 to 50 parts by weight, preferably from 1 to 35 parts by weight per 100 parts by weight of the first or second resin composition.

If the content of the inorganic filler (C) is over 50 parts by weight, the products may be insufficient in impact strength or may have large specific gravities, resulting in impossibility of obtaining light injection foamed articles.

The inorganic filler (C) is material capable of improving rigidity. Examples thereof include particulate fillers such as calcium carbonate, barium sulfate, mica, crystalline calcium silicate and talc, and fibrous fillers such as fibrous magnesium oxysulfate. Preferred are talc and fibrous magnesium oxysulfate.

When the inorganic filler (C) is in particulate form, the average particle diameter is preferably up to 6 μm. By the average particle diameter is meant a 50% equivalent particle diameter D50, which is calculated from an integrated distribution curve by the minus sieve method measured by suspending the particles in a dispersion medium, namely water or alcohol, using a centrifugal sedimentation particle size distribution analyzer.

The inorganic filler (C) may be used with or without being surface treated with a silane coupling agent, titanium coupling agent, higher fatty acid, higher fatty acid ester, higher fatty acid amide, higher fatty acid salt or other surfactants for improving interfacial adhesiveness with or dispersibility in polypropylene resin compositions.

When the inorganic filler (C) is in fibrous form, the average fiber length is preferably from 5 to 50 μm, more preferably from 10 to 30 μm.

Fibrous filler preferably has an average fiber diameter of from 0.3 to 2.0 μm, more preferably from 0.5 to 1.0 μm.

The average fiber length and average fiber diameter of fibrous filler are values determined by observation of images through a scanning electron microscope.

The polypropylene resin compositions or inorganic filler-containing polypropylene resin compositions of the present invention may optionally include additives such as antioxidant, ultraviolet absorber, pigment, antistatic agent, cupper inhibitor, flame retardant, neutralizing agent, plasticizer, nucleating agent and crosslinking agent.

The foamed articles of the present invention include ones obtained by injection foaming a foaming agent-containing polypropylene resin composition which includes 100 parts by weight of the first or second polypropylene resin composition of the present invention and from 0.01 to 10 parts by weight of foaming agent (D).

The foamed articles of the present invention also include ones obtained by foaming a foaming agent-containing polypropylene resin composition which includes 100 parts by weight of the first or second polypropylene resin composition of the present invention, from 0.01 to 50 parts by weight of inorganic filler (C) and from 0.01 to 10 parts by weight of foaming agent (D).

The foamed articles of the present invention may be produced by a method in which a chemical foaming agent or a physical foaming agent such as carbon dioxide and nitrogen in the form of compressed gas or in a supercritical state is added to the first or second resin composition of the present invention in a molding apparatus and the mixture is injected into a mold, thereby forming a foamed article. For producing a foamed article with good appearance, preferably used is a molding method disclosed in JP 2002-225165 A which includes changing the mold clearance after injection.

Examples of the chemical foaming agent include inorganic chemical foaming agents or organic chemical foaming agents generally used as foaming agents for olefinic resins.

Specific examples of the inorganic chemical foaming agents include sodium bicarbonate, ammonium carbonate, ammonium bicarbonate and ammonium nitrite.

Specific examples of the organic chemical foaming agents include citric acid, succinic acid, adipic acid, oxybenzenesulfonyl hydrazide and azodicarbonamide.

From the viewpoint of improvement in physical properties or appearance of foamed articles, preferable as the foaming agent (D) is a chemical foaming agent which generates gas in an amount of 20 to 200 ml per gram of the foaming agent. A plurality of chemical foaming agents may be used so that the amount of gas generated is an amount of from 20 to 200 ml/g.

The method for measuring the amount of gas generated may be, for example, (1) a method including providing a sealable container fitted with a quantity measuring tube connected to a gas buret and a bubble tube, placing a foaming agent into the sealable container, elevating the temperature from room temperature to 250° C. at a rate of 5° C./min, and measuring the volume of gas generated directly on the basis of the volume change, and (2) a method including a sealable container equipped with a pressure gage, placing a foaming agent into the sealable container, elevating the temperature from room temperature to 250° C. at a rate of 5° C./min, measuring the pressure change, and calculating the volume of gas generated from the following formula:

(Volume of gas generated)=(Pressure change)×(Volume of sealable container).

Preferred is method (1).

The chemical foaming agent is preferably a powdery chemical foaming agent because of its superior dispersibility in a polypropylene resin composition.

The method for adding a chemical foaming agent to a polypropylene resin composition or inorganic filler-containing polypropylene resin composition of the present invention may be a method in which a chemical agent is directly added to a resin composition of the present invention when injection foam molding is carried out; or a method in which a masterbatch composed of a thermoplastic resin and a chemical foaming agent which has been kneaded therein with a chemical foaming agent content of from 20 to 80 wt. % based on the whole weight of the masterbatch is added to a resin composition of the present invention. Preferred is the method including the addition of a masterbatch.

Foamed articles of the present invention are preferably foamed articles having a projection with a height of not less than 10 μm but less than 500 μm and a minimum base width of not less than 1 μm but less than 5000 μm because of its good surface quality and good appearance.

The height and the minimum base width of a projection may be determined by three-dimensional analysis using a laser microscope.

Applications of the foamed articles of the present invention include automotive components, components of electric or electronic appliances, building or construction materials, etc. Automotive components are preferred.

Examples

The present invention is explained by reference to examples and comparative examples below.
[Measurements]
The methods for measuring physical properties used in Examples and Comparative Examples are shown below.
(1) Intrinsic Viscosity ([η], Unit: dl/g)
Reduced viscosities were measured at three points of concentrations of 0.1, 0.2 and 0.5 g/dl using a Ubbelohde's viscometer. Intrinsic viscosity was calculated by a calculation method described in "Kobunshi Yoeki (Polymer Solution), Kobunshi Jikkengaku (Polymer Experiment Study) 11" page 491 (published by Kyoritsu Shuppan Co., Ltd., 1982), namely, by an extrapolation method in which reduced viscosities are plotted against concentrations and the concentration is extrapolated in zero. For polypropylene, the intrinsic viscosity was measured at a temperature of 135° C. using tetralin as a solvent.

(1-1) When a homopolymer component (A) and a copolymer component (B1) form a mixture composed of the component (A) and the component (B1) produced after the production of the component (A), the intrinsic viscosities of the component (A) and the intrinsic viscosity of the mixture were measured, respectively, and then the intrinsic viscosity of the component (B1) was calculated from the following equation:

$$[\eta]_B=([\eta]_{Total}-(1-X)[\eta]_A)/X$$

$[\eta]_A$: Intrinsic viscosity of propylene homopolymer component (A) (dl/g)
$[\eta]_{Total}$: Intrinsic viscosity of the mixture (dl/g)
X: Weight fraction of component (B1)

The intrinsic viscosity ($[\eta]_A$) of the propylene homopolymer component (A), which was included in the mixture and was produced in the first step, was determined by sampling a reaction mixture from a polymerization reactor immediately after the production of the component (A) and measuring the intrinsic viscosity ($[\eta]_A$) of the propylene homopolymer component (A) sampled.

(1-2) The weight fraction (X) of the component (B1) was calculated from the equation given below by use of the measurements of crystal fusion heat of the component (A) and the mixture of the components (A) and (B1). The amounts of crystal fusion heat were measured by differential scanning calorimetry (DSC).

$$X=1-(\Delta Hf)_{Total}/(\Delta Hf)_A$$

$(\Delta Hf)_{Total}$=Amount of crystal fusion heat (cal/g) of the mixture
$(\Delta Hf)_A$=Amount of crystal fusion heat (cal/g) of propylene homopolymer component (A)

(2) Melt Index (MI, Unit: g/10 min)
Measurement was carried out according to the method provided in JIS K6758. The measurement was carried out at a temperature of 230° C. and a load of 2.16 kg, unless otherwise stated.

(3) Gel Permeation Chromatography (GPC)
Measurement was carried out under the following conditions:
GPC: Model 150C, manufactured by Waters
Column: Shodex 80 MA (two columns) manufactured by Showa Denko K.K.
Amount of sample: 300 μl (Polymer concentration 0.2 wt %)
Flow rate: 1 ml/min
Temperature: 135° C.
Solvent: o-Dichlorobenzene Using a standard polystyrene manufactured by Tosoh Corp., a working curve of eluted volume vs molecular weight was made. Using the working curve, the weight average molecular weight (Mw) and number average molecular weight (Mn) of the sample were determined using polystyrene as the calibration standard, and then a Mw/Mn ratio (Q value) was calculated as a measure of molecular weight distribution.

(3-1) When the melt index of a polypropylene resin composition was adjusted by use of a peroxide, the Q value of propylene homopolymer (A) was determined by the method including the steps (i)-(iii) given below.

(i) In 1000 ml of boiling xylene was dissolved 5 g of resin composition whose melt index had been adjusted by use of peroxide. The solution was cooled slowly to 50° C. and further cooled to 20° C. under stirring in ice water. After being left to stand at 20° C. for 3 hours, the polymer precipitated was collected by filtering. The polymer precipitated was dried under reduced pressure at 60° C. Thus, a polymer component insoluble in xylene at 20° C. was recovered.

(ii) A 3-gram portion of the polymer component insoluble in 20° C. xylene which had been recovered in (i) above was subjected to extraction with 100 ml of heptane for 6 hours by means of a Soxhlet extractor. The residue remaining after the extraction was dried under reduced pressure at 60° C. Thus, a polymer component insoluble in boiling heptane was recovered. The polymer component recovered which was insoluble in boiling heptane was considered as an extract of the propylene homopolymer (A).

(iii) The extract obtained in (ii) above was subjected to GPC measurement and the Mw/Mn thereof was determined.

(4) Measurement of Volume of Gas Generated (Unit: ml/g)

In a sealable container, one gram of foaming agent was placed and a quantity measuring tube connected to a gas buret and a bubble tube was fitted to the sealable container. While the temperature was elevated from room temperature to 250° C. at a rate of 5° C./min, the volume of gas generated was measured.

(5) Moldability

Injection foam molding was carried out at a barrel temperature of 200° C. and a mold temperature of 50° C. The moldability was evaluated on the basis of the occurrence of short shot in accordance with the criteria shown below.

Good: No short shot occurred.
Poor: Short shot occurred.

(6) Appearance

A specimen produced by injection foam molding was visually examined for (6-1) white streaks in the surface and (6-2) irregularities in the foamed surface.

(6-1) White Streaks in the Surface

A disc-shaped specimen having a radius of 15 cm produced by injection foam molding was rated in four categories as follows:

Grade 4: There were almost no white streaks in the surface.

Grade 3: White streaks were recognized, but most of them were in the region not more than 10 cm from the periphery of the specimen and almost none of them were recognized in the region more than 10 cm away from the periphery.

Grade 2: There were white streaks not only in the periphery of the specimen but throughout the specimen.

Grade 1: The specimen was not suitable for practical use because there were so many white streaks that the color of the specimen changed to whitish.

(6-2) Irregularities in Foamed Surface

Based on the presence/absence of irregularities in the foamed surface, the moldability was evaluated as follows:

Good: No irregularities occurred in the foamed surface.
Poor: Irregularities occurred in the foamed surface.

[Materials]

The materials used in Examples and Comparative Examples are shown below.

(A) Propylene Homopolymer Component

[A-1]

(1) Prepolymerization

In an autoclave equipped with a stirrer, 25 mmol/L of triethylaluminum (hereinafter, abbreviated as TEA), cyclohexylethyldimethoxysilane (hereinafter, abbreviated CHEDMS) as an electron-donating component in a CHEDMS/TEA ratio of 0.1 (mol/mol), and a solid catalyst component prepared by the method disclosed in JP 10-212319 A in an amount such that the polymer weight ratio per gram of the solid catalyst component (hereinafter, the ratio being abbreviated as PP/cat) finally became 2.5 (g/g) were added into hexane which had been fully dewatered and degassed. Then, propylene was fed continuously to yield a slurry of prepolymer. The resulting prepolymer slurry was transferred to another autoclave equipped with a stirrer, fully refined liquid butane was added and preserved at a temperature not higher than 10° C.

(2) Main Polymerization

Propylene homopolymer was produced by polymerization in a single reactor. At a temperature inside the reactor of 80° C. and a pressure inside the reactor of 1.8 MPa under conditions such that the propylene-to-hydrogen volume ratio in the gas phase was kept at 93.4:6.6, the prepolymer slurry prepared in (1) above was subjected to continuous gas phase polymerization under supply of TEA and CHEDMS as solid catalyst components. The catalyst components were supplied so that their concentrations in the polymer became [TEA]=201 ppm, [CHEDMS]=36 ppm, and PP/cat=23,000 (g/g). A small amount of polymer was collected and analyzed. The intrinsic viscosity ($[\eta]_A$) of the resulting polymer was 0.92 dl/g.

[A-2]

The atmosphere in five SUS reactors having a capacity of 45 or 32 m$^3$ equipped with a stirrer and a jacket was fully replaced by propylene. The pressure in the first reactor was adjusted to 0.5 kg/cm$^2$G with propylene and 20 m$^3$ of n-heptane was charged. After starting the stirrer, 50 mole of triethylaluminum was fed and the temperature in the reactor was elevated to 60-75° C. Subsequently, the reaction pressure was increased to 4-8 kg/cm$^2$G with propylene. After adding hydrogen so that the hydrogen concentration was kept to 15-17%, polymerization was started with feed of a solid catalyst component prepared by the method disclosed in JP 10-212319 A. After the start of the reaction, the reaction pressure was increased to an intended level, namely 4.5-9.0 kg/cm$^2$G, while the stability in the reactor was checked. The polymerization was continued while hydrogen was supplied so that the hydrogen concentration in the gas phase was kept to 19-21%. The resulting polymer slurry was discharged to the next reactor and was subjected to polymerization continuously under predetermined conditions. In the five reactors arranged in series, production of crystalline polypropylene portion (hereinafter, referred to as "P portion") by polymerization was continued. The P portion was sampled and analyzed. The P portion had an intrinsic viscosity ($[\eta]_A$) of 0.77 dl/g.

[A-3]

Polymerization was carried out in a manner similar to A-1 while the propylene-to-hydrogen volume ratio in the gas phase was kept to 96.9/3.1. The resulting polymer had an intrinsic viscosity ($[\eta]_A$) of 1.10 dl/g.

(B) Modified Rubber Component

[B-1]

Preparation of B-1

A-1 was transferred to the next polymerization reactor, namely the second reactor, and polymerization was carried out continuously. At a temperature inside the reactor of 70° C. and a pressure inside the reactor of 1.4 MPa under conditions such that the volume ratio of propylene, ethylene and hydrogen in the gas phase was kept at 71.0:20.1:8.9, gas phase polymerization was carried out continuously. The catalyst components were supplied so that their concentrations in the resulting polymer became [TEA]=167 ppm, [CHEDMS]=234 ppm, and PP/cat=4,500 (g/g). The intrinsic viscosity ($[\eta]_{Total}$) of the overall polymer obtained was 0.98 dl/g. The weight fraction X of component (B) was 16 wt. %. Thus, the intrinsic viscosity ($[\eta]_B$) of the component (B-1) was 1.3 dl/g. The ethylene content in (B-1) was 38 wt. %.

[B-2]

Preparation of B-2

A-2 was transferred to the next polymerization reactor, namely the sixth reactor, and polymerization was carried out continuously. The reaction pressure in the sixth through eighth reactors were increased to 2-4 kg/cm$^2$G with propylene and ethylene, and polymerization of an ethylene-propylene copolymer portion (hereinafter, referred to as EP portion) was started. While the reaction pressure was kept to 2-4 kg/cm$^2$G at a reaction temperature of 52° C., propylene/ethylene mixed gas was supplied continuously so that the hydrogen concentration in the gas phase was kept to 0.2 to 0.4%. Thus, the polymerization of the EP portion was continued. The resulting polymer slurry was discharged to the next reactor and was subjected to polymerization continuously under predetermined conditions. Polymerization of the EP portion was continued in the three reactors arranged in series.

The overall polymer slurry in the reactors was transferred to a deactivation vessel. The unreacted monomer was separated and deactivation treatment with water was conducted. Then, the polymer slurry was subjected to centrifugal separation to collect solid polymer, which was then dried in a drier. Thus, a white powder was obtained. The product had an intrinsic viscosity ($[\eta]_{Total}$) of 1.37 dl/g and an ethylene content of 3.8 wt. %. The weight ratio of (A-2) portion to (B-2) portion was 87/13 as calculated from the measurements of the amounts of crystal fusion heat. Therefore, the (B-2) portion had an intrinsic viscosity ($[\eta]_B$) of 5.4 dl/g and the ethylene content in the (B-2) portion was 29 wt. %.

[B-3]
Preparation of B-3

A-3 was transferred to the next polymerization reactor, namely the second reactor, and polymerization was carried out in a manner similar to B-1 under conditions such that the volume ratio of propylene, ethylene and hydrogen in the gas phase was kept at 86.0:14.0:0.3. The intrinsic viscosity ($[\eta]_{Total}$) of the overall polymer obtained was 1.3 dl/g. The weight fraction X of component (B) was 8 wt. %. Thus, the intrinsic viscosity ($[\eta]_B$) of the component (B-3) was 3.6 dl/g. The ethylene content in (B-3) was 29 wt. %.

[B-4]
Used was an ethylene-butene copolymer, EXCELLEN FX CX5502 manufactured by Sumitomo Chemical Co., Ltd. The intrinsic viscosity ($[\eta]_B$) was 0.93 dl/g.

[B-5]
Used was a polyethylene, HI-ZEX 7000FP manufactured by Mitsui Chemicals, Inc. The intrinsic viscosity ($[\eta]_B$) was 3.1 dl/g.

[B-6]
Used was an ethylene-octene copolymer, ENGAGE8150 produced by DuPont Dow Elastomer. The intrinsic viscosity ($[\eta]_B$) was 1.7 dl/g.

Decomposed Resin of a Mixture of A-4 and B-7

Polymerizations were carried out in manners similar to A-1 and B-1 while the propylene-to-hydrogen volume ratio in the first reactor was kept to 98.2:1.8 and the volume ratio of propylene, ethylene and hydrogen in the second reactor was kept to 79.5:20.1:0.4. The intrinsic viscosities of the resulting (A-4) and (B-7) were $[\eta]_A$=1.3 dl/g and $[\eta]_B$=4.0 dl/g, respectively. To 100 parts by weight of the mixture, 1.0 part by weight of a peroxide mixture including 92 parts by weight of propylene homopolymer and 8 parts by weight of 2,5-dimethyl-2,5-di(tert-butylperoxy)hexene was added. The mixture was extruded using a biaxially kneading extruder (TEX44SS 30BW-2V, manufactured by The Japan Steel Works, Ltd.) at a barrel temperature of 250° C., an extrusion rate of 50 kg/hr and a screw speed of 350 rpm. Thus, a melt index-adjusted composition was obtained, whose Mw/Mn was 2.7.

(C) Inorganic Filler

As inorganic filler, talc, MWHST manufactured by Hayashi Kasei Co., Ltd., was used. The average particle diameter was 2.7 μm.

(D) Foaming Agent
[D-1]
Used was CELLMIC MB3074 manufactured by Sankyo Kasei Co., Ltd. The amount of gas generated was 50 ml/g.

[Preparation of Polypropylene Resin Composition]

Polypropylene resin compositions were produced by the following method.

Predetermined amounts of ingredients were weighed out. To 100 parts by weight of their mixture, 0.05 part by weight of calcium stearate (manufactured by Kyodo Yakuhin Co., Ltd.), 0.1 part by weight of Irganox 1010 (manufactured by Ciba Specialty Chemicals) and 0.05 part by weight of ADK STAB PEP-24G (manufactured by Asahi Denka Co., Ltd.) were added. The resulting mixture was premixed uniformly in a tumbler mixer. Then, a composition was produced by kneading and extruding the premixed mixture at an extrusion rate of from 30 to 50 kg/hr, a screw speed of 350 rpm under vent suction using a twin screw extruder (TEX44SS 30BW-2V manufactured by The Japan Steel Works, Ltd.) having a first feed port (upstream) and a second feed port (downstream). Each screw had two kneading zones each including a combination of a triple thread-type rotor and a kneading disc, one kneading zone being arranged next to the first feed port and the other kneading zone being arranged next to the second feed port.

The molten resin produced from the extruder was allowed to pass through a water cooling bath and was cut. Thus, a polypropylene resin composition was obtained.

[Injection Foam Molding]

The methods for preparing the injection foamed articles used in Examples and Comparative Examples are shown below.

(1) Flat Article

To an in-line injection molding unit having a theoretical injection capacity of 1600 cc, a mold having a disc-shaped 2-mm thick cavity 15 cm in radium having a smooth cavity surface was mounted. About 130 g of molten resin was injected into the mold in about 1.5 seconds at a barrel temperature of 200° C. and a mold temperature of 50° C. One second after the completion of the filling, the mold started to be opened in a direction along which the cavity thickness increased. About 2 seconds later, the opening movement of the cavity was stopped when the cavity thickness reached 3.6 mm. After cooling a resulting foamed article for 30 seconds while maintaining that state, the mold was opened. Thus, a polypropylene resin foamed article with a thickness of 3.6 mm was obtained.

(2) Article Having Projections on the Surface

To an injection molding machine the same as that of (1), a mold having a 2-mm thick rectangular cavity was mounted. The mold had, on one cavity surface, concavities corresponding to the projections to be formed in the surface of a foamed article to be produced. The concavities had a depth of 80 μm and a minimum base width of 310 μm. About 280 g of molten resin was injected from the injection molding machine into the mold in the same manner as (1) at a barrel temperature of 200° C. Thus, a polypropylene resin foamed article was produced.

The appearance of the 3.6-mm thick injection foamed articles of polypropylene resin obtained each mold was observed.

In Table 1, compositions of the polypropylene resin compositions and contents of foaming agent in Examples 1-6 and moldability and appearance of the injection foamed articles obtained using the resin compositions are shown.

In Table 2, compositions of the polypropylene resin compositions and contents of foaming agent in Comparative Examples 1-4 and moldability and appearance of the injection foamed articles obtained using the resin compositions are shown.

TABLE 1

|  |  | Example | | | | | |
|---|---|---|---|---|---|---|---|
|  |  | 1 | 2 | 3 | 4 | 5 | 6 |
| Component (A) | Kind | A-1 | A-1 | A-1 | A-1 | A-1 | Decomposition product of A-4 |
|  | Content (wt. %) | 83 | 83 | 64 | 64 | 64 | — |
|  | [η] (dl/g) | 0.92 | 0.92 | 0.92 | 0.92 | 0.92 | — |
|  | Mw/Mn | — | — | — | — | — | 2.7 |
| Component (B1) | Kind | B-1 | B-1 | B-1 | B-1 | B-1 | Decomposition product of B-7 |
|  | *Type of polymer | I | I | I | I | I | — |
|  | Content (wt. %) | 17 | 17 | 13 | 13 | 13 | — |
|  | [η] (dl/g) | 1.3 | 1.3 | 1.3 | 1.3 | 1.3 | — |
| Component (B1) | Kind | — | — | B-4 | B-4 | B-6 | B-4 |
|  | Type of polymer* | — | — | II | II | III | II |
|  | Content (wt. %) | 0 | 0 | 23 | 23 | 23 | 23 |
|  | [η] (dl/g) | — | — | 0.93 | 0.93 | 1.7 | 0.93 |
| Inorganic filler | Content (wt. %) | — | — | — | 18 | — | — |
| MFR of composition (g/10 min) |  | 90 | 90 | 74 | 81 | 43 | 78 |
| Foaming agent | Kind | D-1 | D-1 | D-1 | D-1 | D-1 | D-1 |
|  | Amount of gas generated (ml/g) | 50 | 50 | 50 | 50 | 50 | 50 |
|  | Content (wt. %) | 2 | 2 | 2 | 2 | 2 | 2 |
| **Type of article for evaluation |  | I | II | II | II | II | II |
| Moldability |  | Good | Good | Good | Good | Good | Good |
| White streaks in surface (Grade) |  | 2 | 3 | 4 | 3 | 3 | 4 |
| Irregularity in foamed surface |  | No | No | No | No | No | No |

*Type of polymer
I: Ethylene-propylene copolymer
II: Ethylene-butene copolymer
III: Ethylene-octene copolymer
**Type of article for evaluation
I: Flat article
II: Article having projections on the surface

TABLE 2

|  |  | Comparative Example | | | |
|---|---|---|---|---|---|
|  |  | 1 | 2 | 3 | 4 |
| Component (A) | Kind | A-2 | A-3 | A-1 | A-1 |
|  | Content(wt. %) | 88 | 92 | 64 | 60 |
|  | [η] (dl/g) | 0.77 | 1.1 | 0.92 | 0.92 |
|  | Mw/Mn | — | — | — | — |
| Component (B1) | Kind | B-2 | B-3 | B-1 | B-1 |
|  | *Type of polymer | I | I | I | I |
|  | Content(wt. %) | 12 | 8 | 13 | 12 |
|  | [η] (dl/g) | 5.4 | 3.6 | 1.3 | 1.3 |
| Component (B1) or (B2) | Kind | — | — | B-5 | B-6 |
|  | *Type of polymer | — | — | IV | III |
|  | Content(wt. %) | 0 | 0 | 23 | 28 |
|  | [η] (dl/g) | — | — | 0.93 | 1.7 |
| Inorganic filler | Content(wt. %) | 0 | 0 | 0 | 0 |
| MFR of composition (g/10 min) |  | 130 | 47 | 21 | 32 |
| Foaming agent | Kind | D-1 | D-1 | D-1 | D-1 |
|  | Amount of gas generated (ml/g) | 50 | 50 | 50 | 50 |
|  | Content(wt. %) | 2 | 2 | 2 | 2 |
| **Type of article for evaluation |  | II | II | II | II |
| Moldability |  | Good | Good | Poor | Poor |
| White streaks in surface (Grade) |  | 1 | 1 | 1 | 3 |
| Irregularity in foamed surface |  | No | No | No | No |

*Type of polymer
I: Ethylene-propylene copolymer
III: Ethylene-octene copolymer
IV: Ethylene homopolymer
**Type of article for evaluation
II: Article having projections on the surface The polypropylene resin compositions of Example 1-6 were superior in moldability and the injection foamed articles obtained therefrom had good appearance.

In Comparative Examples 1-3, white streaks occurred in the surfaces of the injection foamed articles.

In Comparative Examples 3 and 4, the moldability was insufficient.

What is claimed is:

1. A polypropylene resin composition comprising from 50 to 95 wt. % of propylene homopolymer component (A) and from 5 to 50 wt. % of ethylene-α-olefin copolymer component (B1), the polypropylene resin composition having a melt index of not less than 40 g/10 min but less than 500 g/10 min, provided that the percentages by weight are based on the combined weight of the components (A) and (B1), wherein the homopolymer component (A) has an intrinsic viscosity $[\eta]_A$ of from 0.5 to 1.2 dl/g, and wherein the ratio of the intrinsic viscosity $[\eta]_{B1}$ of the copolymer component (B1) to the intrinsic viscosity $[\eta]_A$ of the homopolymer component (A), $[\eta]_{B1}/[\eta]_A$, is from 0.5 to 1.85.

2. The polypropylene resin composition of claim 1 wherein the molecular weight distribution (Mw/Mn) of the homopolymer component (A) is not less than 2 but less than 3.2.

3. The inorganic filler-containing polypropylene resin composition which comprises 100 parts by weight of the polypropylene resin composition of claim 1 and from 0.01 to 50 parts by weight of inorganic filler (C).

4. A foamed article obtained by foaming a foaming agent-containing polypropylene resin composition which comprises 100 parts by weight of the polypropylene resin composition of claim 1 and from 0.01 to 10 parts by weight of foaming agent (D).

5. A foamed article obtained by foaming a foaming agent-containing polypropylene resin composition which comprises 100 parts by weight of the polypropylene resin composition of claim 1, from 0.01 to 50 parts by weight of inorganic filler (C) and from 0.01 to 10 parts by weight of foaming agent (D).

6. The foamed article of claim 4 wherein the foaming agent (D) is a chemical foaming agent which generates gas in an amount of 20 to 200 ml per gram of the foaming agent.

7. The foamed article of claim 5 wherein the foaming agent (D) is a chemical foaming agent which generates gas in an amount of 20 to 200 ml per gram of the foaming agent.

8. The foamed article of claim 4 wherein the foamed article has a projection with a height of not less than 10 μm but less than 500 μm and a minimum base width of not less than from 1 μm but less than 5000 μm.

* * * * *